(12) United States Patent
Eriksson

(10) Patent No.: US 8,751,044 B2
(45) Date of Patent: Jun. 10, 2014

(54) CONTROL SYSTEM FOR CONTROLLING AN INDUSTRIAL ROBOT

(75) Inventor: Peter Eriksson, Västerås (SE)

(73) Assignee: ABB Ab, Västerås (SE)

( * ) Notice: Subject to any disclaimer, the term of this patent is extended or adjusted under 35 U.S.C. 154(b) by 814 days.

(21) Appl. No.: 12/520,819

(22) PCT Filed: Nov. 21, 2007

(86) PCT No.: PCT/EP2007/062604
§ 371 (c)(1),
(2), (4) Date: Oct. 19, 2009

(87) PCT Pub. No.: WO2008/074585
PCT Pub. Date: Jun. 26, 2008

(65) Prior Publication Data
US 2010/0036526 A1    Feb. 11, 2010

(30) Foreign Application Priority Data

Dec. 21, 2006    (EP) .................................... 06126954

(51) Int. Cl.
G05B 19/04        (2006.01)
G05B 19/418       (2006.01)
G05B 15/00        (2006.01)
G05B 19/00        (2006.01)

(52) U.S. Cl.
USPC ............ 700/249; 700/247; 700/248; 700/264

(58) Field of Classification Search
None
See application file for complete search history.

(56) References Cited

U.S. PATENT DOCUMENTS 5,710,708 A    1/1998 Wiegand
6,920,373 B2 *  7/2005 Xi et al. ........................ 700/245
(Continued)

FOREIGN PATENT DOCUMENTS

WO    WO 03/103903    12/2003

OTHER PUBLICATIONS

Microsoft.pdf (Microsoft Press, Microsoft Computer Dictionary, Mar. 15 2002, Microsfot Press, Fifth Edition, pp. 356, 456, 575).*

(Continued)

Primary Examiner — Khoi Tran
Assistant Examiner — Bao Long T Nguyen
(74) Attorney, Agent, or Firm — Seppo Laine Oy; Joshua P. Wert

(57) ABSTRACT

A control system for controlling an industrial robot including a manipulator. The control system includes a plurality of modules adapted to handle various functions. A first of the modules is a drive module adapted to control the motors driving the movements of the manipulator. A second of the modules is a main computer module adapted to execute a program with instructions for the movements of the manipulator and to plan the movements of the manipulator based on the executed instructions. The control system is adapted to communicate with one or more external devices via an external network. The control system includes an internal network. Each of the modules is arranged as a node in the internal network and includes communication elements for communicating with the other nodes in the internal network. The internal network includes a first part adapted for normal communication and a second part adapted for time critical communication. The main computer module is arranged as a node in both the first and second parts of the internal network and the drive unit is arranged as a node in the second part of the internal network.

6 Claims, 4 Drawing Sheets

(56) References Cited

U.S. PATENT DOCUMENTS

| | | | |
|---|---|---|---|
| 2001/0035729 | A1 | 11/2001 | Graiger et al. |
| 2002/0131451 | A1 | 9/2002 | Franke et al. |
| 2002/0188381 | A1 | 12/2002 | Bottero et al. |
| 2004/0002778 | A1 | 1/2004 | Glamona et al. |
| 2004/0098153 | A1 | 5/2004 | Neudeck |
| 2006/0161303 | A1* | 7/2006 | Wang et al. .................. 700/259 |
| 2007/0150104 | A1* | 6/2007 | Jang et al. .................... 700/245 |

OTHER PUBLICATIONS

Instruct_Definition.pdf (http://www.merriam-webster.com/dictionary/instruct, Nov. 9, 2012, pp. 1-2).*

Program_definition (Microsoft Computer Dictionary, Mar. 15, 2002, Microsoft Press, Fifth Edition, p. 533).*

Istvan Bezi et al; "Komplett aus Standard-Komponenten Eine Experimentelle Robotersteuerungs-Architektur", Elektronik, vol. 45, No. 1, Jan. 9, 1996; pp. 44-48.

Masatsuga Kametani et al.; "Design Concept for a Robot Controller", Manufacturing Technology International; Jan. 1991; pp. 255-260.

"A Modular Actuator Architecture for Robotic Applications", Innovative Technology Summary Report, U.S. Department of Energy, Office of Environmental Management, Office of Science and Technology; Jul. 31, 2001; pp. 1-25.

Jimenez et al.; "RISC-based architectures for multiple robot systems"; Microprocessors and Microsystems, vol. 16, No. 4, Jan. 1992; pp. 177-186.

Ling et al; "A digital Signal Processor Network for Robot Axis Control"; IEEE Pacific Rim Conference on Communications, Computers and Signal Processing, Jun. 1, 1989; pp. 602-605.

Jean-Dominique Decotignie; "Ethernet-Based Real-Time and Industrial Communications", Proceedings of the IEEE, vol. 93, No. 6, Jun. 6, 2005; pp. 1102-1117.

PCT/ISA/210—International Search Report—Jan. 25, 2008.

PCT/ISA/237—Written Opinion of the International Searching Authority—Jan. 25, 2008.

PCT/IPEA/409—International Preliminary Report on Patentability—Jan. 16, 2009.

Wu, Li-Wei & Hu, Jwu-Sheng, "Distributed Embedded Real-Time Ethernet Platform for Robots Control", Proceedings of the 2005 IEEE International Conference on Mechatronics, Jul. 10-12, 2005, Taipei, Taiwan.

* cited by examiner

CONTROL SYSTEM FOR CONTROLLING AN INDUSTRIAL ROBOT

CROSS-REFERENCE TO RELATED APPLICATIONS

This application claims priority to European patent application 06126954.4 filed 21 Dec. 2006 and is the national phase under 35 U.S.C. §371 of PCT/EP2007/062604 filed 21 Nov. 2007.

TECHNICAL FIELD

The present invention is concerned with a control system for controlling an industrial robot including a manipulator. The invention is suitable for any type of industrial robot such as a parallel kinematic robot as well as a serial kinematic robot.

BACKGROUND ART

An industrial robot comprises a manipulator and a control system for controlling the movements of the manipulator. A manipulator is a movable mechanical unit, the movements of which are driven by one or more motors. Traditionally, the control system includes a stationary control device and a handheld control device. The stationary control device comprises a main control unit including a program memory for storing robot programs including movement instructions for the robot, a program executer for executing the movement instructions and a path planner for planning robot paths based on the movement instructions and for generating control signals to drive units of the robot. During operation of the robot, the program instructions are executed, thereby making the robot work as desired. Drive units are controlling the motors of the robot. The control instructions from the main control unit are transformed into control signals for the drive units of the manipulator. The stationary control device is usually connected to an external network (56) as well as a plurality of other equipment.

The patent application US2002188381 discloses such a control system for robots. The disclosed control system comprises a control unit for generating and controlling the robot paths of the manipulator of the robot, a set of drive units generating control signals for controlling motors associated to the moving robot parts of the manipulator, and an Ethernet-type connection for connecting the control unit and the set of drive units.

One disadvantage of this control system is that it is inflexible. If it is desired, for example, to add a new function or replace some part of the control system, it is necessary to intervene and make changes in the existing control system. For instance, the existing control system must either be oversized from the start regarding computer utility and power supply, or the whole of or parts of the control system must be replaced or be rebuilt to obtain the necessary computer utility and power supply.

From the international patent application WO03/103903A1 such a flexible control system is known. The document discloses a control system comprising a plurality of separate modules. The modules are adapted to handle various functions of the control system, such as drive modules adapted to control the motors driving the movements of the manipulator, and a main computer module adapted to execute a robot program with instructions for the movements of the manipulator. Each of the modules has its own power supply and is adapted to communicate with at least one of the other modules, for example via an Ethernet link. The drive modules are either directly connected to the main computer module or connected in series with the first of the drive modules connected to the main computer module.

However this control system has a limited ability of communication, because when connecting a plurality of modules the physical structure of the information transfer system soon becomes complex and demands a large amount of hardware, such as wiring and communication equipment.

An article written by Istvan Bezi and Gabor Tevesz, "Komplett aus standard komponenten eine experimentelle robotsteuerungs architektur", 20 May 2004 discloses a control system for a robot including a plurality of physically separated modules and an internal network, wherein the modules are arranged as nodes in the internal network and comprises communication means for communicating with the other nodes in the internal network.

SUMMARY OF THE INVENTION

The object of the invention is to provide a control system with improved communication ability.

Such a control system is characterised in that the internal network comprises a first part adapted for normal communication and a second part adapted for time critical communication, and the main computer module is arranged as a node in both the first and second part of the internal network and the drive unit is arranged as a node in the second part of the internal network.

The first part of the internal network is adapted for normal communication between the connected modules and the second part of the internal network is adapted for time critical communication between the connected modules. With time critical communication is meant that the transfer of data has a demand on a predictable transfer time, such as a real-time demand. With normal communication is meant transfer of data that is less time critical. The second part of the internal network is adapted for time critical communication. This means that the network is arranged such that a predictable transfer time of the data is achieved, for instance by avoiding delays and waiting times in the data transfer.

The division of the internal network into two parts makes it possible to separate time critical communication from communication traffic that is not as time critical. Thereby, a fast and secure transmission of time critical data can be assured and accordingly a predictable performance of the data transfer can be guaranteed. For example, there is real-time demand on the communication between the main computer module and the drive modules. For example, the transfer of position references from the main computer module to the drive modules is time critical. Other example of time critical data is safety data, such as emergency stop of the robot.

According to the invention, the main computer module is connected to both the first and second parts of the internal network, and the drive modules of the manipulator are connected to the second part of the internal network. Thus, it is possible for the main computer module to use the first part of the internal network, which is adapted to handle time critical data, when communicating with the drive modules, and to use the second part of the internal network when communicating with other modules connected to the internal network. The invention makes it is possible to send time critical data, such as real time data, between the main computer module and the drive modules, without any interference from the communication between the other modules on the internal network.

According to an embodiment of the invention, the first part of the internal network is connected to the second part of the internal network via a router. This embodiment makes it possible for all internal nodes to communicate with each other on the internal network and thereby achieve a flexible internal communication in the control system.

All nodes in the internal network have an address in the internal network, such as an IP-address. Thereby it is made possible for each module to communicate directly with all the other modules, regardless of where the modules are placed physically relative to each other. Because all the modules are connected individually to an internal network and are able to communicate with each other over the internal network, it is made possible to add modules to the control system without making any alterations in the already connected modules and thereby use less hardware such as wiring and communication devices. It is further made possible to easily optimize the size and the functionality of the control system and thereby the cost by connecting or disconnecting a node of the internal network. Further it is made possible to connect computer means of different size comprising modules of different function and size to the internal network. The internal network is, for example, a wired or a wireless local area network (LAN, WLAN) of Ethernet type. Preferably, the electronics of the internal network comprises a switch for controlling transfer of data packages between the nodes of the internal network.

According to an embodiment of the invention, the internal network is connected to the external network via a router. The router is then functioning as a controlled separation and isolation between the internal network and the external network, which also may be connected to other internal networks. The objective of the router is to determine the next address to send the data package. The router protects the internal network from unwanted access from the external network. This also makes it possible to use different speeds in the internal and external networks, for instance so that the communication in the internal network may be transmitted with faster speed than in the external network.

According to an embodiment of the invention, at least one of the modules is also arranged as a node in the external network. This makes it possible for the module to communicate directly with all the other nodes in the external network. For instance, it is advantageous if the main computer module communicates directly with nodes on the external network.

According to an embodiment of the invention, the third of the modules is one of the following: a drive module, a safety module adapted to carry out safety functions of the robot, and a hand-held programming unit for teaching and programming the robot. The number of drive modules needed is dependent on the number of movable mechanical units, such as manipulators or external arms, which are connected to the control system. Thus, if the control system controls two manipulators, the control system has two drive modules connected to the internal network. The present invention makes it easy to add and remove an extra drive module to and from the control system. The extra drive module is easily connected to or disconnected from the network.

A control system has to include a safety function, and it is advantageous to have a separate safety module including the safety functions. The safety module is adapted to handle safety signals and initialize actions in dependence thereon, such as an emergency stop. The safety module is, for instance, adapted to transmit an enabling signal to the drive module or to transmit an alarm to the main computer module.

It is also advantageous to connect the hand-held programming unit to the internal network of the control system.

It is further an advantage to connect an input/output interface module to the internal network. The input/output interface module connects external equipment to the internal network and thereby makes it possible for the external equipment to communicate directly with the external equipment. This embodiment enables the control system to cooperate directly with external equipment, such as a machine tended by the robot, for instance a robot cooperating with a rolling mill or a painting robot cooperating with a paint refill system.

Further, the control system may include a process control module for controlling a process in a facility.

The control system comprises at least three modules connected to the network. However, the number of modules is not limited. The number of modules connected to the network depends on the desired functionality and power of the control system. More modules with the same or different functionality as described above may be connected to the internal network.

According to another embodiment of the invention, at least one of the modules is also arranged as a node in another internal network. For example, the other internal network belongs to another control system controlling another robot cell. This is an advantage when several processes are synchronized, such as when the work in two robot cells is synchronized.

According to another embodiment of the invention, the internal network comprises a first and a second part and the first part of the internal network is connected to the second part of the internal network via a router. This makes it possible to use different speeds in the different parts of the internal network, for instance so that communication with requires a fast speed is occurs in one part of the network and communication which does not require a fast speed occurs in the other part of the network.

According to an embodiment of the invention, the modules are replaceable with a new module with an extended or reduced functionality. This makes it possible to change the number of actions for carrying out the function of the modules. This is useful if the control system has to be changed to perform another task, for instance perform a less complex or more complex application.

Other advantageous features and advantages of the invention will appear from the following description.

BRIEF DESCRIPTION OF THE DRAWINGS

The present invention will be described in more detail in connection with the enclosed schematic drawings.

DESCRIPTION OF THE PREFERRED EMBODIMENTS

Figure 1:
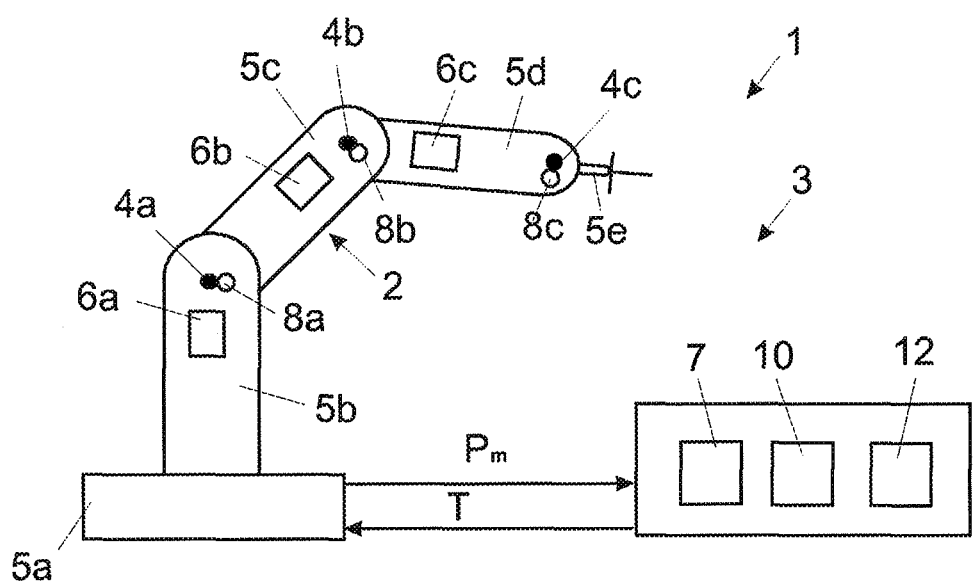
FIG. 1 shows an industrial robot comprising a manipulator and a conventional control system adapted to control the robot.

FIG. 1 shows an industrial robot I comprising a manipulator 2 and a conventional control system 3. The industrial robot 1 has a plurality of robot parts movable relative to each other. The robot parts are in this case a stand 5a, robot arms 5b-d, and a tool holder 5e. The industrial robot comprises a plurality of actuators 6a-c for controlling the position and speed of the robot parts. Each actuator is connected to a drive module 7 for generating control signals to the motors. The manipulator 2 is also provided with sensors 8*a-c* detecting the position of the robot parts. Signals from the sensors 8*a-c* are transmitted to the control system 3. The control system 3 thereby receives signals comprising measured data Pm. The measured data comprises, for instance, angular position, velocity, and acceleration.

The control system 3 comprises, in this case, a main computer module 10 comprising a program executer for executing the movement instructions, and a path planner planning the robot paths and further generating torque reference signals to the drive module 7 based on the movement instructions from the robot program and a mathematical model of the robot. The control system further comprises, a memory module 12 for storing control programs including movement instructions for the robot. During operation of the robot, the program instructions are executed, thereby making the robot work as desired. The drive module 7 is controlling the motors by controlling the motor torque and the motor position in response to the reference values from the main computer module 10. The drive module generates control signals T to the motors of the robot. The main computer module comprises a logic unit or computing unit comprising a microprocessor, or processors comprising a central processing unit (CPU) or a field-programmable gate array (FPGA) or any a semiconductor device containing programmable logic components and programmable interconnects for performing the steps in a computer program. It is to be understood that the manipulator 2 may also comprise robot parts that are linearly movable relative to each other or both movable or rotatable or linearly movable relative to each other.

Figure 2:
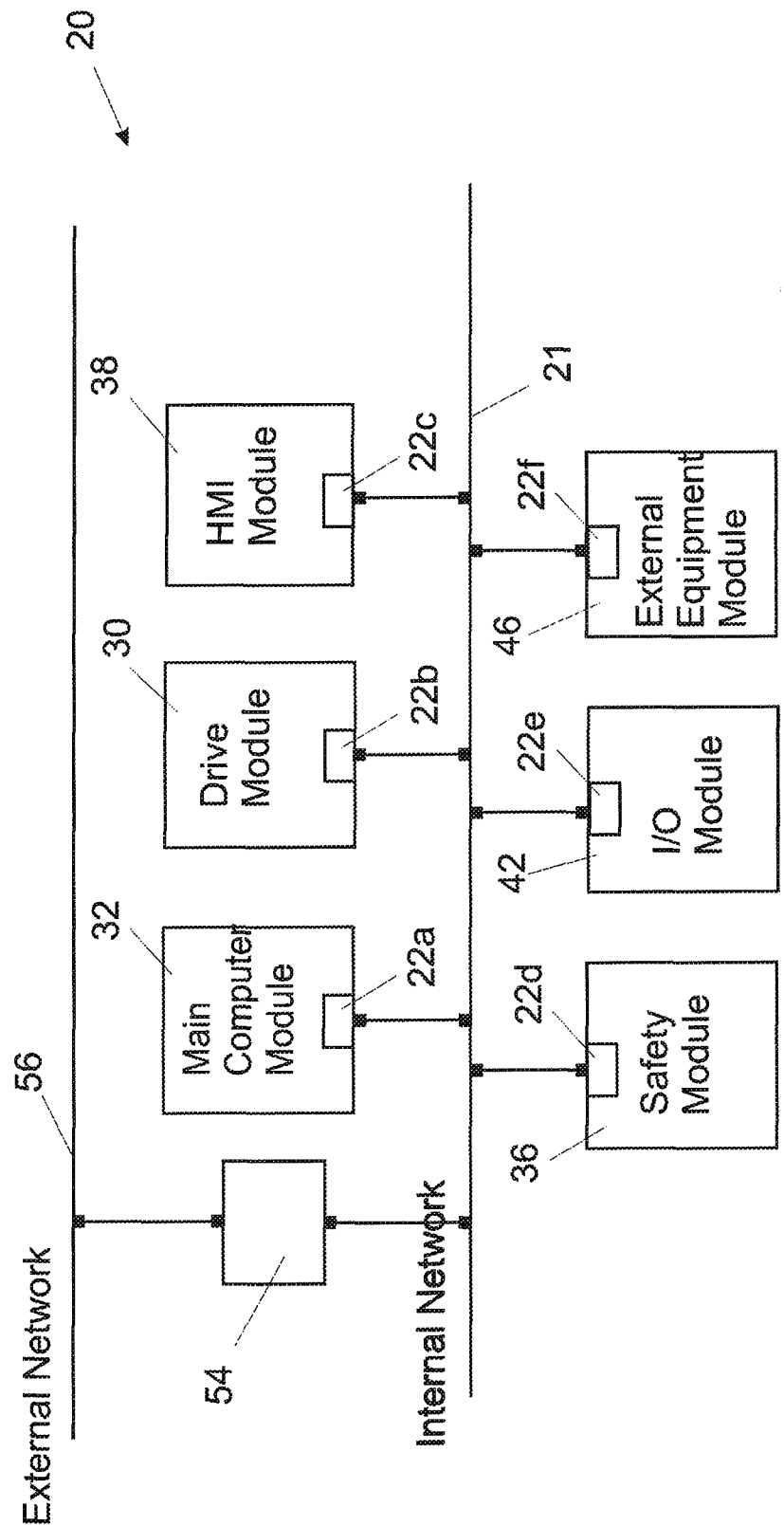
FIG. 2 shows schematically an overview of a robot control system according to a first embodiment.

FIG. 2 shows schematically an embodiment of a robot control system 20. The control system 20 comprises a plurality of separate modules, which are arranged to handle different functions of the control system. The control system further comprises an internal network 21 for communication between the separate modules. The internal network is a communication network for communication in a specific working area and may be a wired network, a wireless network or a combination of both. The network solution is any of: LAN, WLAN, an Ethernet communication type, or the like.

Different types of modules are connected to the internal network 21. Each type of module is adapted to independently manage a specific function for the control system. When the modules are connected to the internal network 21, they form a control system with all the functions of a conventional control system. The control system composed of the separate modules does not need to include all types of modules and may include several modules of the same type. Each of the modules forms a unique node in the internal network.

The modules are adapted to communicate with each other through the internal network 21. Each module comprises communication means, for instance a Central Processing Unit (CPU) and an interface unit 22*a-f*, adapted for communication over the internal network 21. The interface units 22*a-f* are adapted to send and receive data packages. The electronics of the internal network also comprises a switch for controlling transfer of data packages between the nodes of the internal network. The interface units include, for example, Network Interface Cards (NIC). The interface units also comprise a network interface connector. The network interface connector is a contact if the internal network is wired or an antenna/radio transmitter if the internal network is wireless. The CPU and the NIC may be arranged, for instance, in the same integrated circuit (IC). Each interface unit 22*a-f* is arranged with means for recognising which other modules are connected to the internal network and to which node a specific module is connected, when the interface unit 22*a-f* is connected to a node in the internal network. This makes it possible for each node to communicate with all the other nodes in the internal network, i.e. to select which module interface unit 22*a-f* to communicate with. The protocol used on the internal network 21 may vary in dependence on which modules that is communicating with each other. Any common standard protocol, Internet protocol, machine protocol or the like may be used.

The control system 20 is connected to an external network 56 for communication with external devices and other control systems. The internal network 52 and the external network 56 is connected to each other via a router 54.

The control system 20 includes a drive module 30 adapted to control the motors driving the movements of a manipulator, a main computer module 32 adapted to execute a program with instructions for the movements of the manipulator, a safety module 36 adapted to carry out safety functions of the robot, a human machine interface module (HMI) 38 for teaching and programming the robot, an input/output interface module (I/O) 44, and a machine interface (MMI) module 46 adapted to connect external equipment to the network.

The main computer module 32 includes a program executor for executing the program instructions of the robot programs, and a path planner for planning the robot paths and generating torque reference signals to the drive module 30. The main computer module 32 is adapted to send reference signals to the drive module 30 over the internal network 21 during operation of the robot.

The drive module 30 is adapted to control the motors driving the movements of the manipulator. The drive module 30 also comprises an output interface connected to each actuator controlling the current transmitted to the motors for controlling the position and speed of the motors.

The HMI 38 for teaching and programming the robot is, for instance, a hand-held programming unit, such as a Teach Pendant Unit (TPU).

The input output interface module (I/O) 44 is adapted to receive and send signals between external equipment or to be used as receiver/transmitter when using an internal network comprising both wired and wireless connections.

The MMI 46 is adapted for communication with external interfaces for external electric equipment or other electronics connected to the control system. The robot operator determines which type of electronics or equipment is to be connected to the control system. The equipment installed may, for example, be a welding machine or a painting machine. It is possible for the user to make external changes in this module so as to suit the requirements of the user. For instance, when adding a welding machine the welding liquid flow, air pressure and laser-focusing depending on the pressure may be controlled. When installing a painting machine the paint flow may be controlled.

In another embodiment, the external equipment may also be arranged with the communication hardware and is thereby adapted to be directly connected to the internal network as a node of the internal network, with a fixed function, such as a hard disk drive (HDD).

Figure 3:
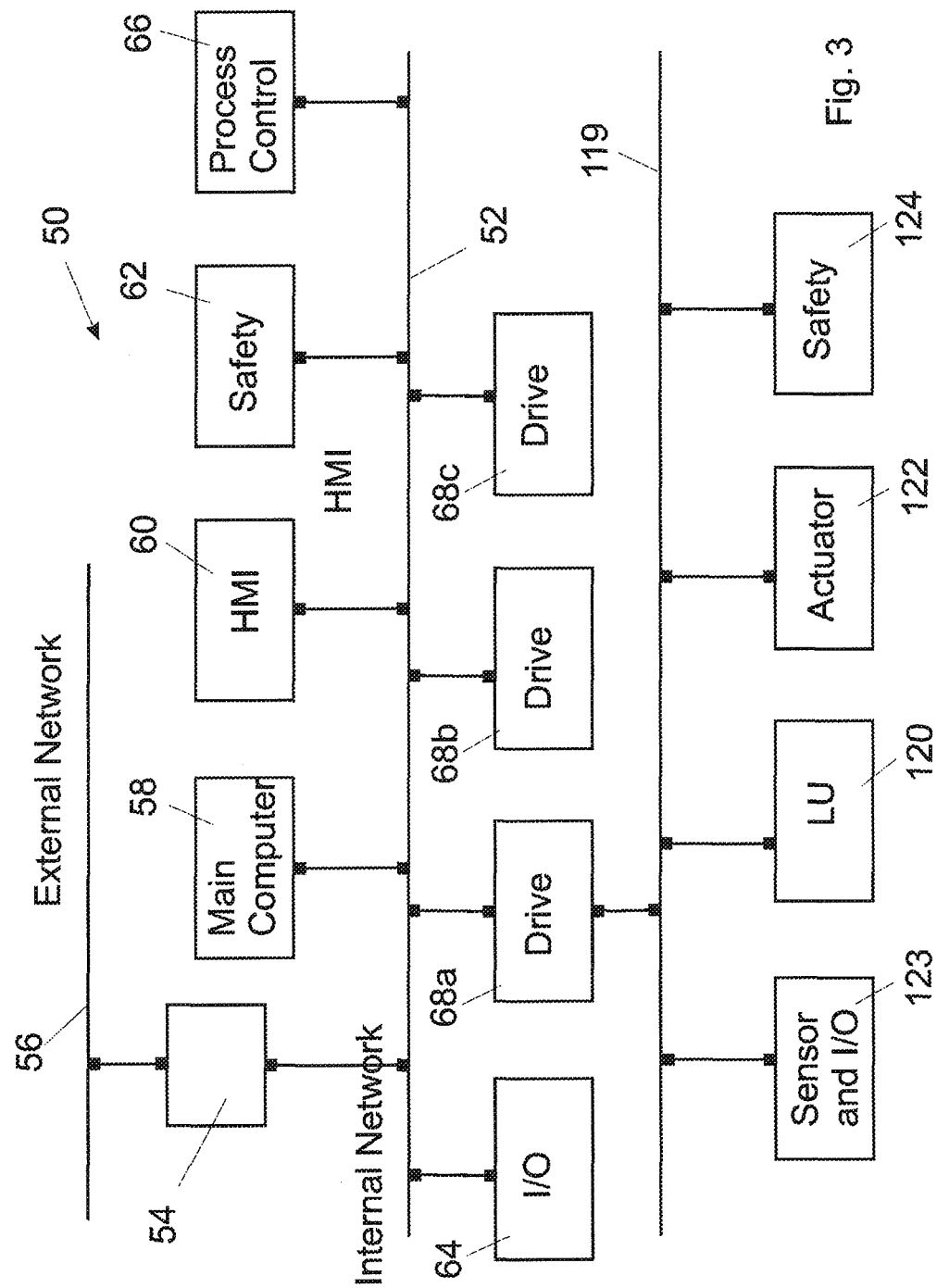
FIG. 3 shows schematically an overview of a robot control system according to another embodiment.

The FIG. 3 shows an embodiment of a robot control system 50. The control system is controlling three manipulators in a robot cell. The control system comprises an internal network 52. To the internal network 52 a router 54 is connected. The router 54 connects the internal network 52 with an external network 56. The external network 56 is, for instance, a network for communication between pluralities of robot control systems.

There are several modules connected to the internal network 52: a main computer module 58, an HMI module 60, a safety module 62 and an I/O module 62, an I/O module 64, a process control module 66, and three drive modules 68a-c with functions as described in the text describing FIG. 2.

The drive modules 68a-c control one manipulator each of the robot cell. Each drive module 68a-c is arranged with communication hardware and is thereby adapted to be connected as a node in the internal network. The drive modules generate analogue control signals to the motors based on the reference signals from the main control unit 58. In this embodiment the drive unit is also a node in another internal network 119. For example, the network 119 is the internal network of another control system. In this example, a logic unit (LU) 120, an actuator 122, a sensor and an I/O module 123 for receiving position and torque signals from sensors of the robot, and a safety unit 124 is connected to the internal network 19.

Figure 4:
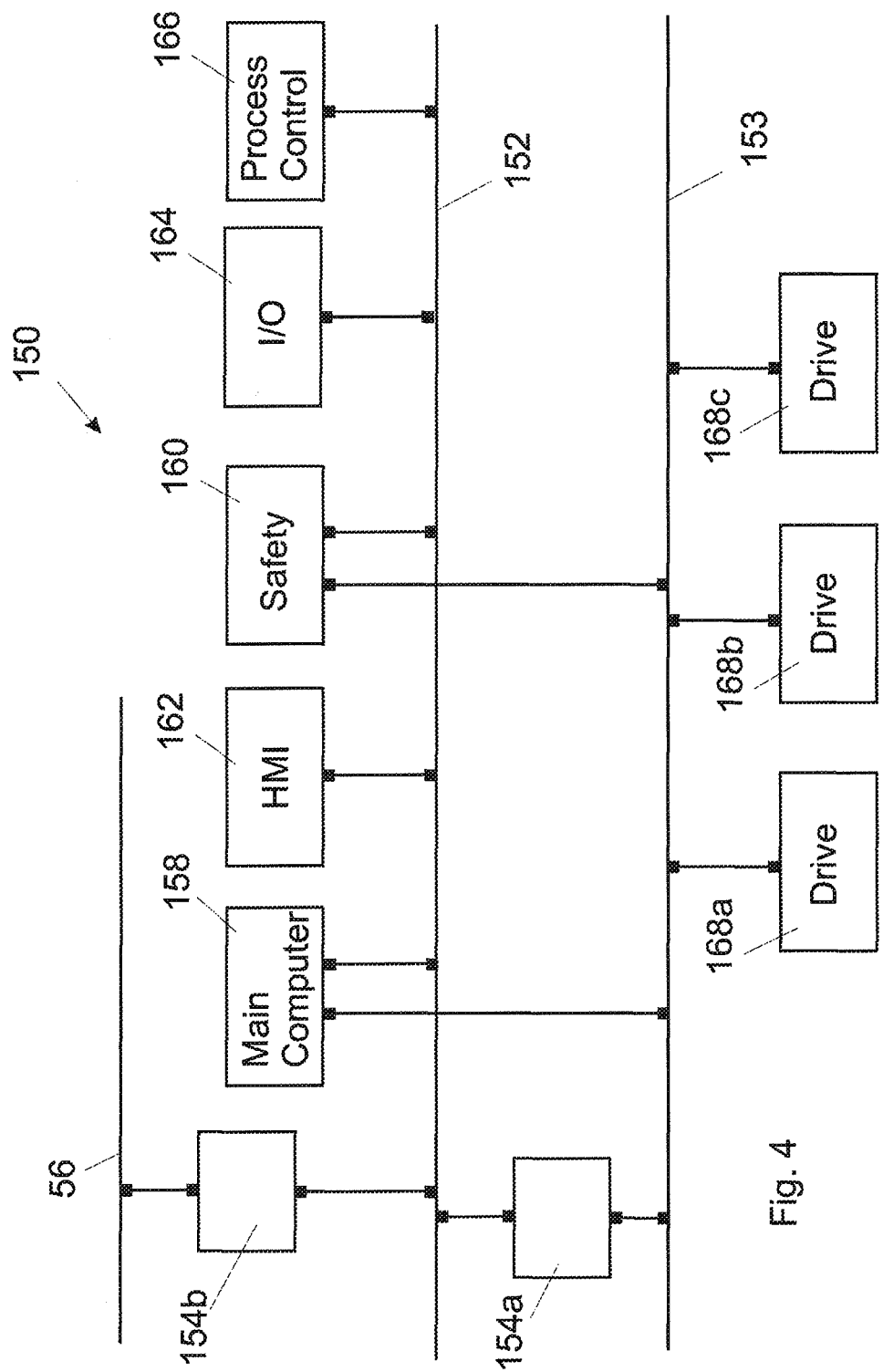
FIG. 4 shows schematically an overview of a robot control system according to an embodiment of the invention.

FIG. 4 shows a robot control system 150 according to the invention for controlling a robot system comprising three manipulators. The control system comprises an internal network separated in a first part 152 and a second part 153. The two parts of the internal network are separated with a first router 154b. The first part of the internal network 152 is adapted for normal communication between the connected modules and the second part of the internal network 153 is adapted for time critical communication between the connected modules. This means that the second part of the network is built such that delays in the data transfer are avoided; for example, it is avoided to store the data in a buffer before sending it. How to adapt a network for time critical transfer of data is known in the art.

A main computer module 158 is connected to both the first part 152 and the second part 53 of the internal network 152. In this embodiment, a safety module 160 adapted to carry out safety functions of the control system are also connected to both the first part 152 and the second part 53 of the internal network 152. To the first part of the internal network 152 the following modules are also connected: an HMI module 162, and an I/O module 162, an I/O module 164, a process control module 166, 68 with functions as described in the text describing FIG. 2. The drive modules 168a-c of the manipulators are connected to the second part 153 of the internal network. Thereby, the main control module 158 and the safety module 160 can transmit time critical data to the drive modules 168a-c on the second part of the internal network, and use the first part of the internal network when communicating with the other modules connected to the internal network.

The main computer module is adapted to generate reference signals for controlling the motors of the manipulators, such as position references or torque references, which are sent to the drive modules. The drive modules control the motors of the robot based on the received reference signals. The transfer of position references between the main computer and the drive modules has to be done in real time. The reference signals change very quickly and therefore are not to be disturbed by or forced to wait during other communication transmitted in the internal network. Therefore it is advantageous to send the reference signals to the drive units on the second part 152 of the internal network 153. The main control module also sends a selection of the reference signals, for instance every 10$^{th}$ reference signal to the process control module 166, to be used in statistical calculations for the process. This transfer is not time critical and the transfer is preferable done on the first part 153 of the internal network.

If an emergency stop order is sent by the safety module 160 to the drive modules, ordering one drive modules to immediately stop the motors, it is advantageous if the communication between the safety module and the drive module is fast and is not to be disturbed by or forced to wait during other communication transmitted in the internal network in order.

The present invention is not limited to the embodiments disclosed but may be varied and modified within the scope of the following claims. For example, other types and number of modules can be connected to the first and second part of the internal network. The number of drive units depends on the application and accordingly the number of drive modules connected to the second part of the network may vary.

The invention claimed is:

1. A control system for controlling an industrial robot including a manipulator, the control system comprising:
    a main computer module adapted to execute movement instructions from a robot program and generate reference signals to the drive module based on said movement instructions
    a drive module adapted to generate analog control signals to motors driving movements of the manipulator in response to said reference signals generated by the main computer module
    a human machine interface module adapted to teach and program the robot,
    a local area network having a first part adapted for normal communication and a second part, distinct from the first, said second part adapted for time critical communication and configured to provide predictable timing for data transfer, and
    wherein each of said modules is arranged as a node in the local area network and comprises a communication module configured to communicate with the other nodes in the local area network, and said main computer module is arranged as a node in both the first and second parts of the local area network, said human machine interface module is arranged as a node in the first part of the local area network, and said drive module is arranged as a node in the second part of the local area network, and
    wherein the control system is adapted to communicate with one or more external devices via an external network, said external network being distinct from said local area network.

2. The control system according to claim 1, wherein the first part of the local area network is connected to the second part of the local area network via a router.

3. The control system according to claim 1, wherein the local area network is connected to the external network via a router.

4. The control system according to claim 1, wherein in at least one of the modules is also arranged as a node in the external network.

5. The control system according to claim 1, further comprising:
    a safety module adapted to carry out safety functions of the robot, wherein the safety module is arranged as a node in both the first and second parts of the local area network.

6. The control system according to claim 1, further comprising:
    an input/output interface module adapted to connect external equipment to the local area network, wherein the input/output interface module is arranged as a node in the first part of the local area network.

* * * * *